No. 887,725. PATENTED MAY 12, 1908.
I. R. HUTCHINSON & B. HUNT.
FRUIT SEEDING MACHINE.
APPLICATION FILED JUNE 17, 1907.
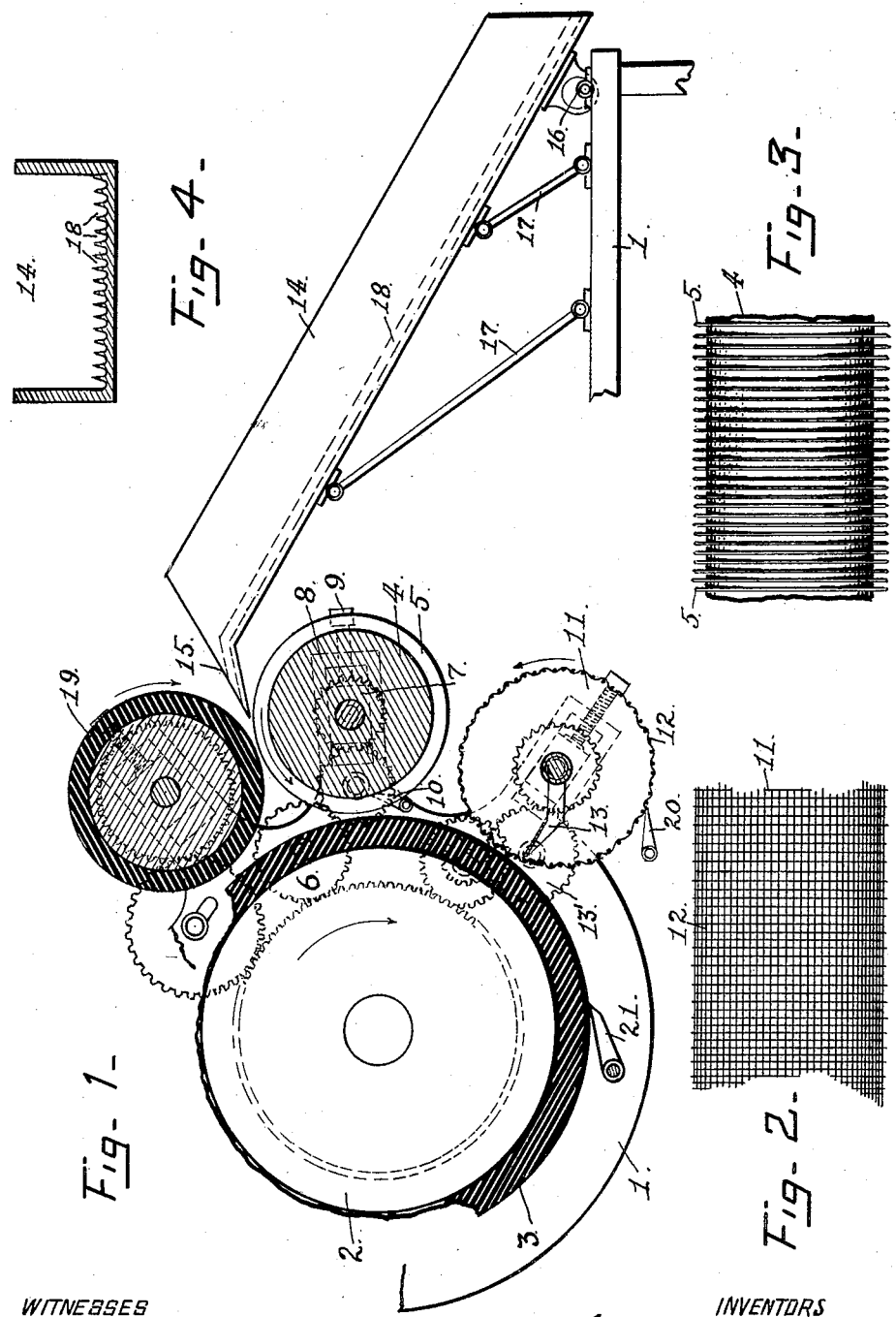
WITNESSES
INVENTORS
Ira R. Hutchinson
Ben Hunt
BY
ATTORNEY

UNITED STATES PATENT OFFICE.

IRA R. HUTCHINSON AND BEN HUNT, OF FRESNO, CALIFORNIA; SAID HUNT ASSIGNOR TO UNITED STATES CONSOLIDATED SEEDED RAISIN COMPANY, OF NEW YORK, N. Y., A CORPORATION OF NEW YORK.

FRUIT-SEEDING MACHINE.

No. 887,725.  Specification of Letters Patent.  Patented May 12, 1908.

Application filed June 17, 1907. Serial No. 379,309.

*To all whom it may concern:*

Be it known that we, IRA R. HUTCHINSON and BEN HUNT, citizens of the United States, residing at Fresno, in the county of Fresno and State of California, have invented certain new and useful Improvements in Fruit-Seeding Machines, of which the following is a specification.

Our invention relates to that class of fruit-seeding machines in which a pair of opposing rolls operate to separate the seeds from the fruit, by the pressure of one forcing the seeds out into the other, as the fruit passes between them. Heretofore, machines of this type have had the main-roll, which is often termed the "carrier", formed with a number of projecting pins or teeth set so close together as to exclude or prevent the seeds from passing between them, and have had the opposing roll, often termed the "pressure roll", made with a yielding or elastic surface which receives the excluded seeds, forming, as it were, pockets for them to pass by in, when forced out from the fruit by the pins or teeth of the main-roll, upon which pins or teeth the meat of the fruit is impaled. These machines have been found to work successfully with raisins and have generally been applied to the seeding of such fruit.

In their operation, it will be seen, that the pins or teeth of the main-roll have to puncture the raisin on one side, and as they force the seed out, the seeds themselves puncture and tear the raisin on the other side, so that the fruit is quite extensively cut and torn. This, though a disadvantage, affecting deleteriously the appearance and keeping qualities of the raisins, has, nevertheless, been deemed unavoidable, for the operation seemed to require such specialized pressure of teeth or pins, puncturing and entering one side, in order to force the seeds out through the other side.

The object of our invention is to overcome this disadvantage of breaking, puncturing and cutting the fruit on both sides; and this object we attain by dispensing with the use of a main-roll having teeth or pins, and substituting therefor a non-penetrating or smooth main-roll, and by employing means, in advance of the seed-separating rolls, for slitting the skin of the fruit, before it is subjected to said rolls, on that side through which the seed is to be forced. The fruit is thus cut only on one side, and, therefore, presents a better appearance, and its keeping qualities are improved.

To this end our invention consists in the novel constructions, arrangements and combinations, which we shall, hereinafter, fully describe.

Our machine, though applicable to other fruit, is especially intended for seeding raisins, in which connection we shall describe it.

Reference is hereby made to a copending application, Serial Number 379,308, filed June 17, 1907.

Referring to the accompanying drawings, Figure 1 is a vertical cross-section, broken, of our machine. Fig. 2 is a front view, broken, of the seed-receiving roll. Fig. 3 is a broken detail, in elevation, of the slitting cylinder. Fig. 4 is a cross-section of the feeder, to show its bottom grooves or ways.

1 indicates a part of any suitable supporting frame, in which is mounted the main-roll 2, to which a rotary motion is given, in the direction of the arrow, by any suitable mechanism. This main-roll 2, it will be observed, has a non-penetrating or smooth surface. Its surface may be of any suitable character adapted to impose pressure on the raisin, without breaking its skin in any manner, on that side which it presses against. We deem the best surface to be a relatively yielding or elastic one, such as is indicated by the covering 3.

Opposing the main-roll 2, on one side, is the slitting or cutting cylinder 4, which may be suitably constructed. In the form we have shown, it is composed of a core, Fig. 3, with encircling, spaced knives 5. This cutting cylinder rotates in the direction of the arrow, by any suitable means, as, for example, by the rotation of the main-roll acting through a gear-train indicated by 6, and it is mounted, as indicated in Fig. 1, in a box 7, which is adjustable in a bearing 8, by means of a screw 9, so that it may be set up to its place to suit the size of fruit being operated on.

10 is one of a series of fingers which enter the spaces between the knives 5 and serve to remove the fruit from said knives.

— Below the cutting cylinder 4 is the opposing roll 11 of the pair of seed-separating rolls.

It is provided with any form of surface which will receive the seed under the pressure of the main-roll. In its best form, this roll 11 is a hollow one, its surface being made of foraminous material, either a screen or perforated metal, the holes, spaces, interstices or meshes in which are large enough to receive the seeds, but too small to permit the meat to be pressed through. We have here shown it as made with a screen surface 12, and having within it some form of scraper or brush to remove the clinging seeds from the inner surface. This is here shown as a scraper 13. This roll 11 is also adjustably mounted, so that it may be set up in proper relation to the main roll; and it receives rotation by any suitable means, as, for example, from the main roll through the intervention of a gear-train 13'.

14 represents a fruit feeder. It may be of any suitable character, and it is so disposed as to feed the fruit to the top of the cutting cylinder. It is here shown as an inclined trough, the spout 15 of which overlies the cutting cylinder, and the base of which is pivotally supported on the frame 1, at which point there is a cam or eccentric device, indicated at 16, which will give the trough an eccentric swinging movement on its supporting links 17. These links, under the action of the cam 16, will give the feeder such a movement that the raisins, resting and traveling in the parallel, bottom grooves or ways 18, Fig. 4, of the trough, will move up the incline and be discharged by the spout of the feeder, with precision. The bottom grooves 18 of the feeder are disposed in line with the knives 5 so that the fruit will be delivered directly to said knives. Above the cutting cylinder is the roll 19, also adjustably mounted and having a yielding or elastic surface, as indicated. It is so disposed relatively to the cutting cylinder that it opposes said cylinder in such proximity as to furnish the necessary resistance to the raisins to enable the cutting knives to slit the skin as the fruit passes between said roll and cylinder. This resistance, in addition to mere pressure, may involve in the best construction, a holding back on the fruit, attained by driving the cutting cylinder at a higher rate of speed than that at which the pressure roll 19 is driven. This difference in rate is indicated by the gearing here shown, and the result is a positive draw cut, as it were, which is very effective in slitting the raisin skins.

20 is a plate the purpose of which is to scrape off any seeds which may cling to the exterior of the seed-receiving roll 11.

21 is a plate which removes any fruit which may stick to the main-roll 2.

The operation of the machine is as follows:—The raisins are supplied to the feeder 14, and in its bottom grooves they travel upwardly and are delivered to the top of the cutting cylinder. As they pass between the cylinder and the opposing pressure roll 19, their skins are slit on one side only; and then they are removed from the cylinder by the fingers 10 and pass down between the seeding rolls 2 and 11. Between these the seeds are separated from the meat by being pressed out by the main-roll, acting against the uncut side, through their slitted sides, into the opposing roll 11. In the form shown of this roll 11, the seeds enter the spaces or meshes of the screen-periphery of the roll and are scraped off inside, and may be got rid of in any suitable manner. The meat, freed from the seeds, passes down between the rolls and falls down into a suitable receptacle, or, such as clings to the main-roll, is removed by the plate 21. This operation of seed separating is rendered possible by the preliminary slitting of the raisin skins on that side through which the seeds are to be forced. The openings thus prepared are sufficient to allow the general non-penetrating pressure of the main-roll to force the seeds out against a receiving roll; and, in the best form, which is here shown, the foraminous character of the receiving roll, provides such easy entrance for the seeds, that the main-roll may be a cushioned one, as shown, thereby avoiding the slightest injury to the raisins.

Having thus described our invention, what we claim as new and desire to secure by Letters Patent is,

1. In a fruit-seeding machine, the combination of a main-roll having a smooth surface; an opposing roll to receive the seeds forced out by the main-roll; and means, in advance of said rolls, for cutting the skin of the fruit on that side through which the seeds are to be forced.

2. In a fruit-seeding machine, the combination of a main-roll having a smooth surface; an opposing hollow roll having a foraminous surface the openings in which permit the passage of the seeds, while excluding the meat of the fruit; and means, in advance of said rolls, for cutting the skin of the fruit on that side through which the seeds are to be forced.

3. In a fruit-seeding machine, the combination of a main-roll having a cushioned surface; an opposing roll to receive the seeds forced out by the main roll; and means, in advance of said rolls for cutting the skin of the fruit on that side through which the seeds are to be forced.

4. In a fruit-seeding machine, the combination of a main-roll having a cushioned surface; an opposing hollow roll having a foraminous surface the openings oin which permit the passage of the seeds, while excluding the meat of the fruit; and means, in advance of said rolls for cutting the skin of the fruit on that side through which the seeds are to be forced.

5. In a fruit-seeding machine, the combination of a main-roll having a smooth surface; an opposing roll to receive the seeds forced out by the main-roll; and means, in advance of said rolls, for cutting the skin of the fruit on that side through which the seeds are to be forced, comprising a revoluble cutting cylinder and an opposing pressure roll.

6. In a fruit-seeding machine, the combination of a main-roll having a smooth surface; an opposing hollow roll having a foraminous surface the openings in which permit the passage of the seeds, while excluding the meat of the fruit; and means, in advance of said rolls, for cutting the skin of the fruit on that side through which the seeds are to be forced, comprising a revoluble cutting cylinder and an opposing pressure roll.

7. In a fruit-seeding machine, the combination of a main-roll having a cushioned surface; an opposing roll to receive the seeds forced out by the main-roll; and means, in advance of said rolls, for cutting the skin of the fruit on that side through which the seeds are to be forced, comprising a revoluble cutting cylinder and an opposing pressure roll.

8. In a fruit-seeding machine, the combination of a main-roll having a cushioned surface; an opposing hollow roll having a foraminous surface the openings in which permit the passage of the seeds, while excluding the meat of the fruit; and means, in advance of said rolls, for cutting the skin of the fruit on that side through which the seeds are to be forced, comprising a revoluble cutting cylinder and an opposing pressure roll.

9. In a fruit-seeding machine, the combination of a main-roll having a smooth surface; an opposing roll to receive the seeds forced out by the main-roll; and means, in advance of said rolls, for cutting the skin of the fruit on that side through which the seeds are to be forced, comprising a revoluble cutting cylinder having a series of spaced annular knives, and an opposing pressure roll; and a feeder having a series of parallel ways for guiding the fruit to said knives.

10. In a fruit-seeding machine, the combination of a main-roll having a smooth surface; an opposing hollow roll having a foraminous surface the openings in which permit the passage of the seeds, while excluding the meat of the fruit; a means, in advance of said rolls, for cutting the skin of the fruit on that side through which the seeds are to be forced, comprising a revoluble cutting cylinder having a series of spaced annular knives, and an opposing pressure roll; and a feeder having a series of parallel ways for guiding the fruit to said knives.

In testimony whereof we have signed our names to this specification in the presence of two subscribing witnesses.

IRA R. HUTCHINSON.
BEN HUNT.

Witnesses:
N. A. ACKER,
D. B. RICHARDS.